United States Patent [19]

Barnhardt et al.

[11] Patent Number: 5,593,167
[45] Date of Patent: Jan. 14, 1997

[54] HIGHWAY VEHICLE

[75] Inventors: Steve L. Barnhardt, High Point, N.C.; Steven L. Hadley, Delaware, Ohio; Jeff M. Terry, Birmingham, Ala.

[73] Assignee: Volvo GM Heavy Truck Corporation, Greensboro, N.C.

[21] Appl. No.: 363,002

[22] Filed: Dec. 22, 1994

[51] Int. Cl.⁶ ........................................... B60R 3/00
[52] U.S. Cl. ................. 280/164.1; 280/163; 180/68.5; 220/326
[58] Field of Search ................... 280/762, 769, 280/163, 164.1, 169, 166, 164.2; 180/68.5, 89.12; 296/183, 62; 220/326, 348

[56] References Cited

U.S. PATENT DOCUMENTS

| | | |
|---|---|---|
| 1,023,848 | 4/1912 | Huff . |
| 1,287,151 | 12/1918 | Wamback . |
| 1,327,223 | 1/1920 | Boyle . |
| 1,422,763 | 7/1922 | Hollis .................... 280/164.1 |
| 1,456,167 | 5/1923 | Wiswell et al. . |
| 1,797,873 | 3/1931 | McManus . |
| 2,501,526 | 3/1950 | Laucks .................... 220/326 |
| 2,981,554 | 4/1961 | Mulder et al. . |
| 3,667,563 | 6/1972 | Korb et al. . |
| 3,880,445 | 4/1975 | Chieger .................... 280/762 |
| 3,903,981 | 9/1975 | Peterson . |
| 3,930,552 | 1/1976 | Kunkle et al. . |
| 4,013,300 | 3/1977 | Berger . |
| 4,074,786 | 2/1978 | Joubert . |
| 4,102,432 | 7/1978 | Bustin .................... 280/163 |
| 4,480,845 | 11/1984 | Hansen .................... 280/164.1 |
| 4,836,568 | 6/1989 | Preslik et al. .................... 280/164.1 |
| 4,863,053 | 9/1989 | Oberg .................... 220/326 |
| 4,991,906 | 2/1991 | Fingerle .................... 280/164.1 |
| 5,033,567 | 7/1991 | Washburn et al. .................... 180/89.12 |
| 5,054,799 | 10/1991 | Fingerle .................... 280/164.1 |
| 5,293,951 | 3/1994 | Scott .................... 180/68.5 |

FOREIGN PATENT DOCUMENTS 195361  4/1923  United Kingdom .................. 280/164

*Primary Examiner*—Robert J. Oberleitner
*Assistant Examiner*—Min Yu
*Attorney, Agent, or Firm*—Watts, Hoffmann, Fisher & Heinke Co., L.P.A.

[57] ABSTRACT

An over-the-highway truck or tractor vehicle having an elongate rail forming a portion of a vehicle frame and an improved battery box in the form of a unitary molded container defining multiple sides of a battery retention space. One of the sides is a base for supporting at least one battery. The container includes a moveable closure which together with the base defines the battery retention space. The enclosure allows access to a battery supported by the container for battery placement in and removal from the battery retention space. Structure including a lower step fixedly connected to the rail supports the container. Pairs of recesses are integrally molded in the base of the container. Air tanks are partially positioned in the recess in a container reinforcing relationship. Connection structure fixes the air tanks and the container together.

27 Claims, 5 Drawing Sheets

HIGHWAY VEHICLE

TECHNICAL FIELD

This invention relates to over the highway trucks and tractors and more particularly a vehicle equipped with a novel and improved combination battery box, step and air tank assembly.

BACKGROUND OF THE INVENTION

Each large Class 8 over the highway truck and tractor vehicle typically is equipped with three brake system air tanks. The first is a so called "wet tank" which is provided to condense, trap and collect water from water vapor entrained in compressed air provided for a vehicle's brake system. The second and third tanks are independent tanks to provide primary and backup supplies of air for the vehicle's brakes.

Secure yet accessible mounting of these three tanks has been something of a problem. They are relatively bulky, so that relatively large volumes of limited space between rails of a vehicle frame are taken up by them. In addition, they must be positioned such that there is access for connection and service of air conduits to and from them, as well as valving for the brake system and typically with a highway tractor conduits for connection to brake lines of a coupled trailer.

Space within a vehicle frame is at a premium because not only must it contain and support the three air tanks and various associated service lines, but other components such as fuel tanks, fuel and electrical lines and in some cases hydraulic lines and systems, as well as the drive train and accessories.

Class 8 vehicles also typically carry three or four heavy duty batteries for such purposes as providing adequate cranking power to start a large diesel engine and providing adequate power for lighting and accessories. Accordingly, a typical Class 8 vehicle is also equipped with a sturdy battery box for securely mounting and housing the vehicles batteries. Such a battery box also occupies substantial space further contributing to the problem of locating all necessary and desired vehicle components.

Ideally all components are mounted accessibly and at the same time positioned to leave adequate room for a comfortable operating compartment and an engine compartment of sufficient space to afford access to the engine and other vehicle components such as power steering and air conditioning units which are typically located in engine compartments. Further, all of the vehicle components must be sufficiently nested within or otherwise supported by the frame to allow adequate road clearance and to minimize interference with air currents generated by a moving vehicle. In short, they must be positioned to keep vehicle wind drag to an absolute minimum for economy which is vital to profitable vehicle operation.

SUMMARY OF THE INVENTION

With a vehicle made in accordance with this invention a light weight battery box preferably formed of a fiberglass reinforced resin is provided. The box has spaced fore and aft base stiffeners in which three transverse recesses are defined by surfaces each of which is a segment of a cylinder of a diameter corresponding to an associated air tank. The air tanks are respectively positioned in these recesses and secured to the battery box in a semi nesting relationship to provide transverse box reinforcement, recessed tank storage for appropriate clearance, service access and minimal air flow interference. Thus, the air tanks serve to stiffen and reinforce the battery box, so that the combination battery box/air tank arrangement provides a sturdy, readily accessible battery box.

A pair of spaced battery box supports are secured to the frame. Each support has an inturned lip at its lower end which slidingly receives and then supports the battery box. In the preferred and disclosed embodiment, a vehicle step is secured to the support lips providing the dual function of connecting the supports together to provide reinforcement to assist the battery box to which the supports are also connected, in resisting support spreading under the weight of the battery box. The step also provides the more conventional function of facilitating ingress and egress to and from the vehicle cab.

The novel combination battery box, air tank and step assembly has a number of outstanding advantages. First, by grouping the tanks together, assembly, installation and maintenance are all greatly facilitated. Second, the lengths of conduits interconnecting the tanks are greatly reduced. Third, the inherent strength of an air tank is put to use to stiffen the battery box, transversely of the vehicle. Fourth, the stiffening effects of the depending stiffeners permit the battery box to be made of light material. Fifth, the inherent tensile strength of a step is put to use to provide reinforcement against the spreading of the battery box supports such that the step and the supports together become a frame for the combination battery box/air tank and that frame too is of extremely light weight.

In over-the-highway trucks and tractors minimizing weight is of vital importance to the profitability of its operation. Minimizing weight of course means fuel economy. It also means for every one pound reduction in the weight of a highway tractor, there is a potential lawful payload increase of 250 ton miles over a typical 500,000 mile life of the tractor. A prototype vehicle including a prototype assembly embodying the present invention and constructed in accordance with the present disclose, produced a weight saving in excess of 20 pounds, as compared with a current vehicle model of the assignee of this patent which is expected to be replaced by a new model represented by the prototype. Thus, the weight savings of the battery box, air tank and step assembly of this invention will result in a potential payload increase of 5,000 ton miles or, where payloads are below the lawful limit, significant fuel economies over the life of the vehicle.

Accordingly, an object of the invention is to provide an over the highway vehicle equipped with a novel and improved battery box, air tank and step assembly.

DESCRIPTION OF A PREFERRED EMBODIMENT

Figure 1:
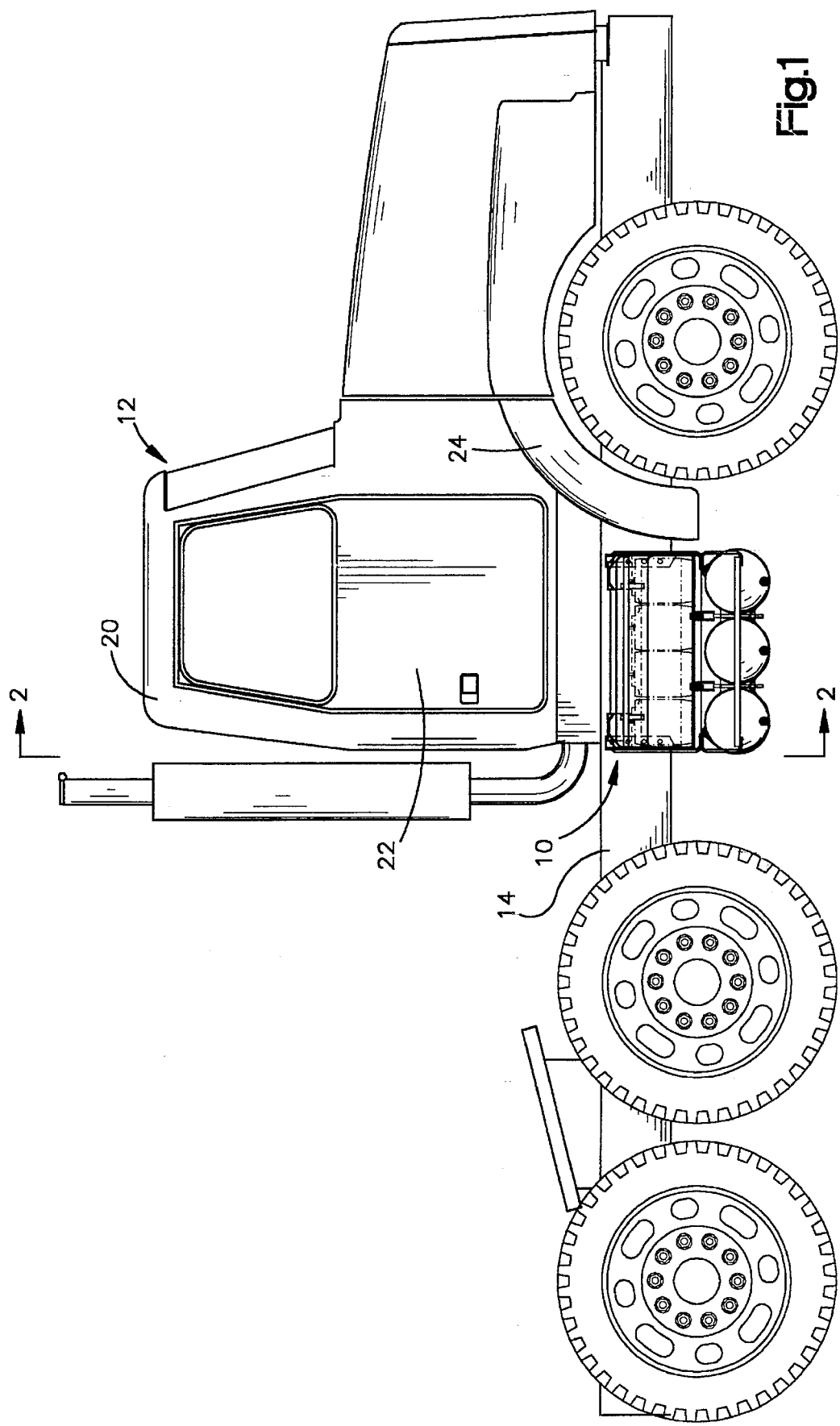
FIG. 1 is a side elevational view of a vehicle having a battery box, step and air tank assembly embodying the present invention, mounted below a cab of the vehicle.

An over-the-highway truck or tractor vehicle 12 equipped with a battery box, step and tank assembly 10, embodying the present invention, is illustrated in FIG. 1. The vehicle 12 includes a pair of longitudinally extending rail members 14 which form a portion of a frame of the vehicle. The rail members 14 support a "conventional" cab 20. The cab 20 is supported by a suspension system (not shown) located between the cab and rail members 14. Preferably the suspension system is the system described and claimed in copending application (attorney's docket 13-389) which is assigned to the assignee of this patent and which is hereby incorporated by reference. The cab 20 has a passenger side door 22 and a driver's side door (not shown) for access to the cab.

Figure 2:
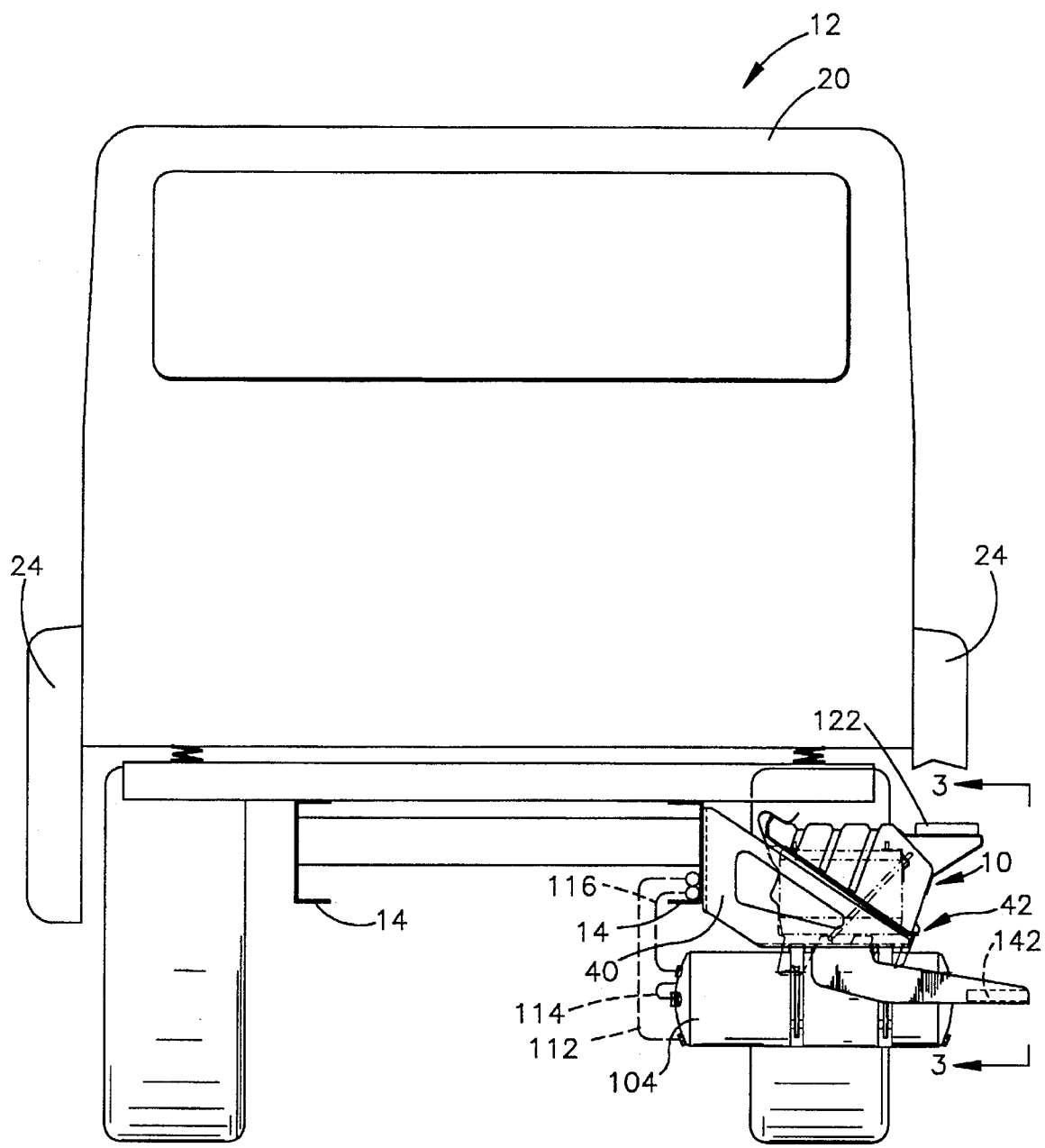
FIG. 2 is a cross-sectional view of the vehicle of FIG. 1, as seen from the plane indicated by the line 2—2 in FIG. 1.

As viewed in FIG. 1, the assembly 10 is positioned behind a front fender 24 of the vehicle 12 and, as viewed in FIG. 2, substantially within the longitudinal extent of the cab 20 and below the door 22. While the assembly 10 is illustrated below a door on the passenger side of a "conventional" cab, it should be apparent that the assembly of the present invention could be positioned on the driver side or on a "cab-over" vehicle.

The assembly 10 (FIGS. 2 and 3) includes supports 40a, 40b, preferably made from metal, for supporting a fiber glass reinforced plastic battery box receptacle or container 42. The supports 40a, 40b are fastened as by bolts 41 to a rail member 14 of the vehicle 12. The supports include lower inturned lips 43a, 43b which mount and support the container 42 on the vehicle.

Figure 3:
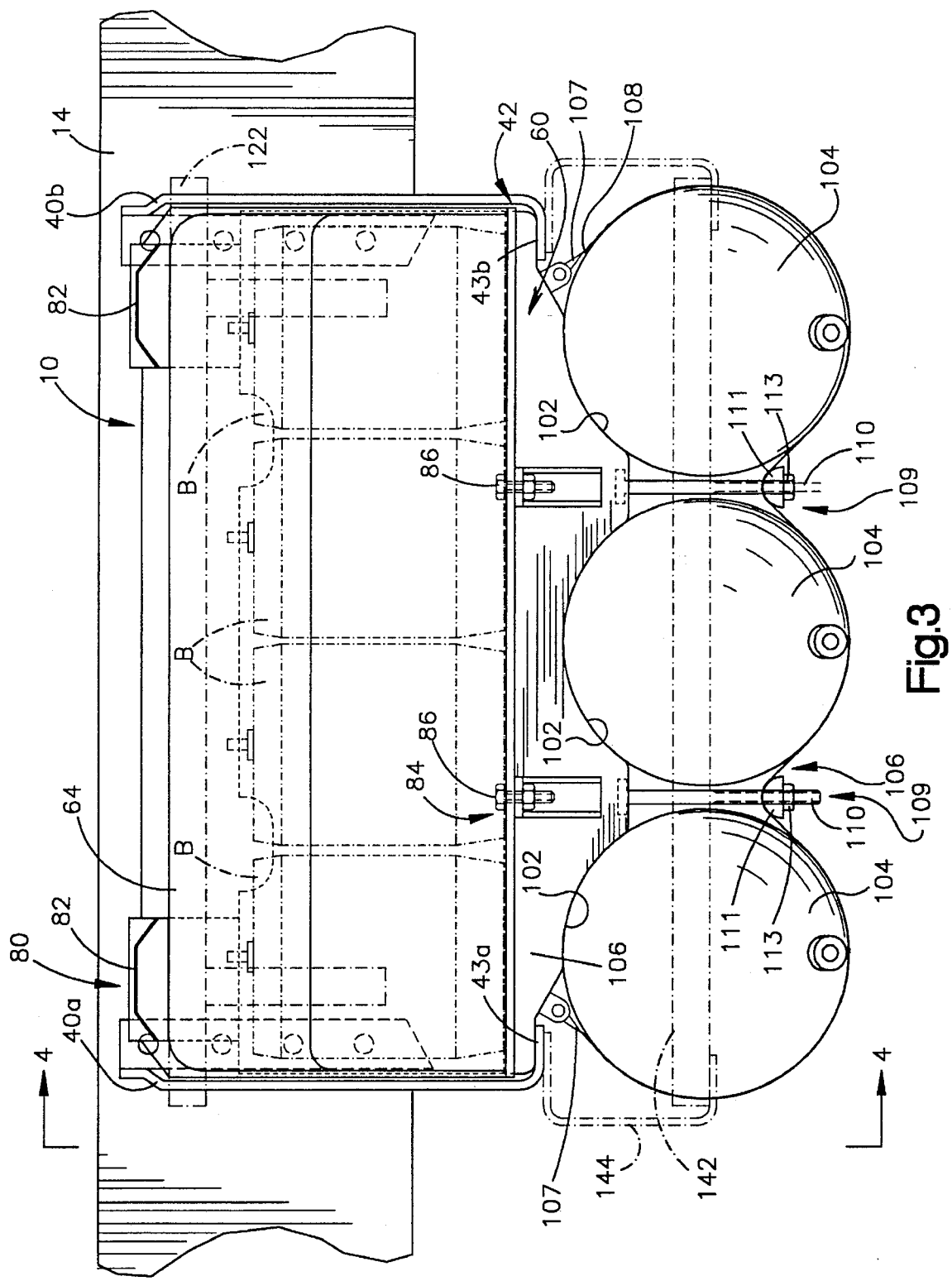
FIG. 3 is an enlarged side elevational view of the battery box, step and tank assembly as seen from the plane indicated by the line 3—3 in FIG. 2.

The container 42 includes a bottom portion or tray 60 (FIGS. 3 and 4) for supporting one or more batteries B (four which are shown in FIGS. 1 and 3). The tray 60 includes a relatively flat base or surface 62 (FIG. 4) which is adapted to face upwardly for supporting the batteries B. Hold-down structure 58 is provided to retain the batteries B against movement relative to the base 62.

The container 42 also includes an enclosure cover 64. The cover 64 is preferably molded from the same fiber reinforced plastic material as the tray 60. The tray 60 and cover 64 cooperate about interengaging lips 66, 68 (FIG. 4), to form an enclosure that contains and protects the batteries B from moisture, dirt, debris and other environmental conditions that the vehicle 12 typically encounters.

The container 42 includes retention structure for retaining the cover 64 in engagement with the tray 60 in an enclosing position. The retention structure includes a spring clamp mechanism 80 and a latch mechanism 84. The spring clamp mechanism 80 (FIGS. 3 and 4) includes a pair of enclosure clips 82 made from spring steel. Each enclosure clip 82 is formed into a generally U-shape. A first leg of the U-shaped enclosure clip 82 is connected to the tray 60 by suitable means, such as threaded fasteners. A second leg of the U-shaped enclosure clip 82 resiliently and slidably engages an upper surface 130 of the cover 64 to maintain the left end of the cover, as viewed in FIG. 4, against the tray 60.

The latch mechanism 84 (FIGS. 3 and 5) includes a pair of elastic fasteners 86. The fasteners are received in cover recesses 90, 92 (FIG. 5) formed in a side surface 128 of the cover 64. In use, the fasteners 86 clamp the right end of the cover 64, as viewed in FIG. 4, in engagement with the right end of the tray 60. Suitable fasteners are rubber retainers sold by Griffith Rubber Mills of Portland, Ore. as part No 76500.

Figure 4:
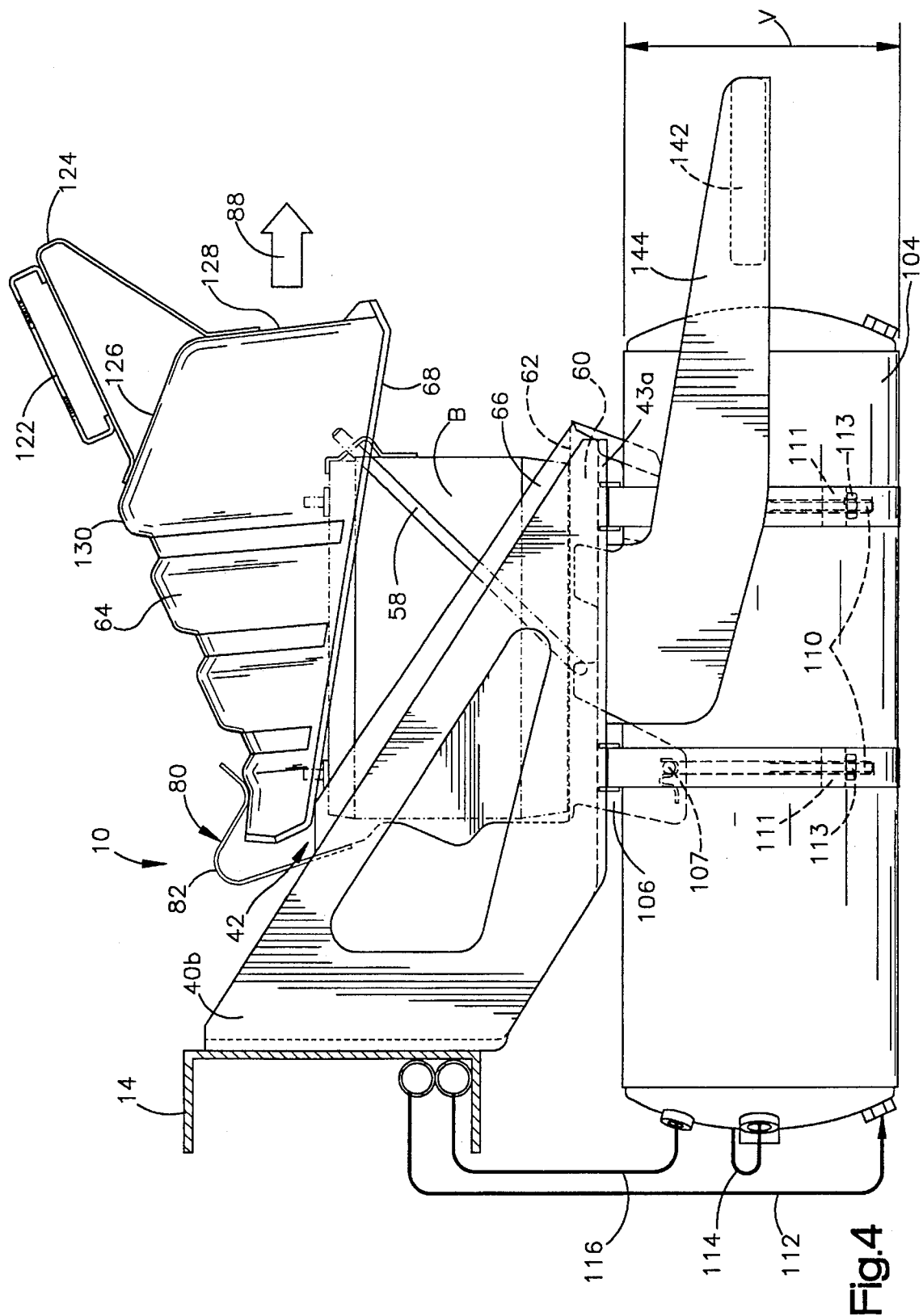
FIG. 4 is an enlarged end elevational view of the battery box, step and tank assembly of FIG. 2 illustrating parts in different positions.

To service the batteries B, the fasteners 86 are released and the cover 64 is swung upwardly relative to the tray 60 to the position illustrated in FIG. 4. The cover 64 can then be removed by moving it laterally in a direction outwardly from the vehicle 12 and away from the tray 60 in a substantially horizontal direction, as indicated by the arrow 88.

The tray 60 includes inboard and outboard, longitudinally extending, depending stiffeners 106, each of which includes three downwardly directed recesses 102 (FIG. 3). The recesses 102 are integrally molded into the stiffeners and face downwardly, when the battery box and step assembly 10 is properly installed on a vehicle 12. The recesses 102 are each formed as a segment of a cylinder to receive and engage an outer surface of an associated one of three cylindrical air tanks 104. The tanks are the usual condensation, supply and backup tanks for the braking system of the vehicle 12.

The tanks 104 are held in reinforcing engagement with the stiffeners 106 (FIG. 3) by a pair of straps 108 and one or more tensioner assemblies 109. Each strap 108 is fixed at its ends 107 to the tray 60. Each of the tensioner assemblies 109 include a T-bolt threaded fastener 110, a washer 111 having an annular surface facing upwardly as viewed in FIG. 3, and a nut 113. The threaded fastener 110 is supported by its T-head in an insert clip 107 riveted to the tray 60 to prevent rotation of the fasteners. The washers 111 are tightened against the straps 108 to tension the straps 108 and firmly hold the tanks 104 in engagement with the surfaces defining the recesses 102. The strength of the tanks 104 is, thus, used to reinforce the tray 60 transversely of the vehicle. The relatively lightweight tray 60 is shown supporting four batteries B.

The rearward tank is the condensation tank 104 which is connected to an air compressor (not shown) of the vehicle 12 by a supply line 112 (FIG. 4). The other of the tanks 104 are connected to the condenser tank by lines 114. Brake supply lines 116 conduct pressurized air from the supply and backup tanks to the vehicle's air brakes. The lines 114 can be installed on the assembly 10 prior to the final assembly of the vehicle 12. Thus, simplified plumbing with the fluid pressure lines 112, 114, 116 is provided by using the battery box, step and tank assembly 10 of the present invention because all of the cylinders 104 are mounted accessibly and in close proximity to one another.

Figure 5:
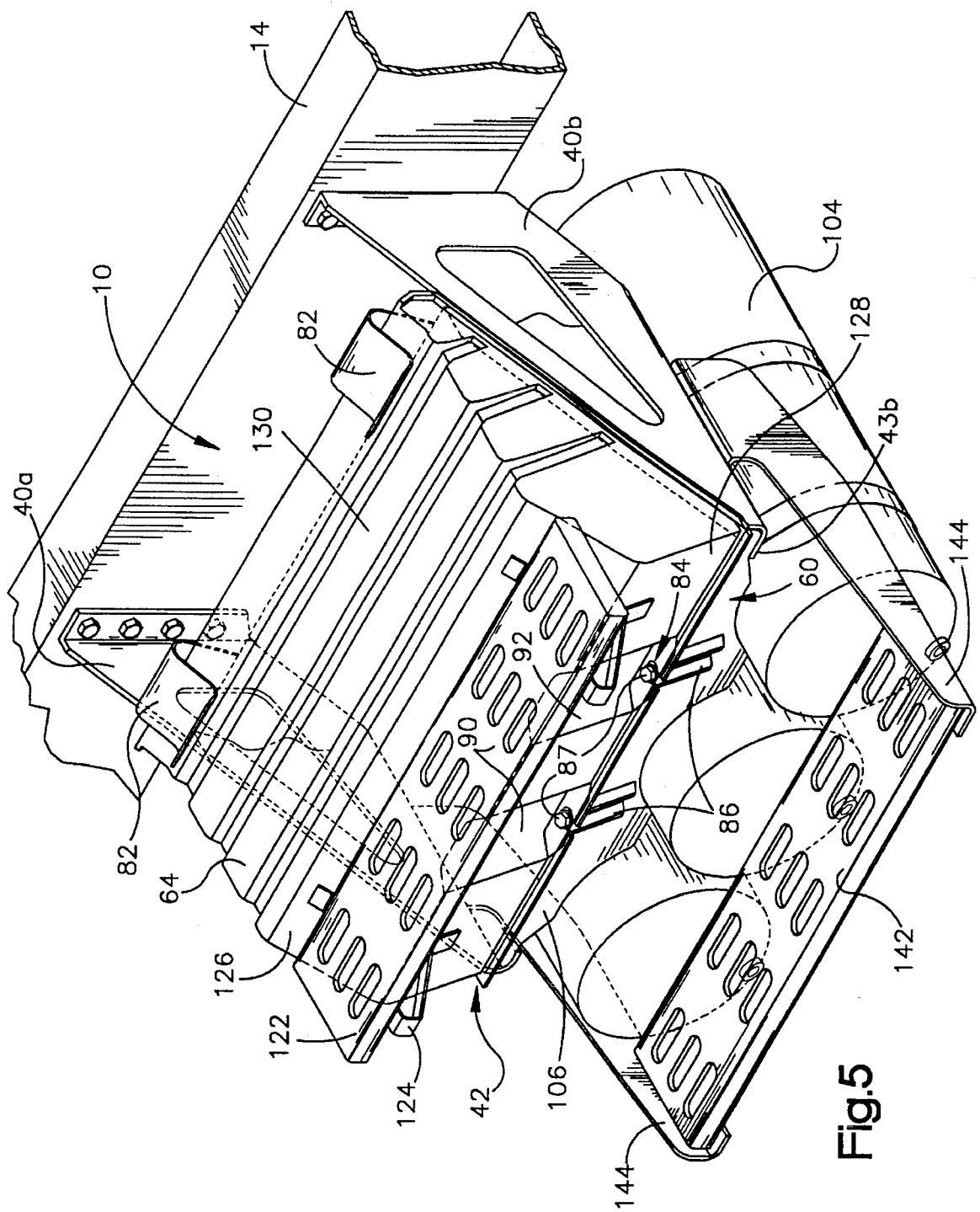
FIG. 5 is a perspective view of the battery box and step assembly.

A step tread 122 (FIGS. 2–5) is fixed to the cover 64 to facilitate ingress into, and egress from, the cab 20 through the door 22. The step tread 122 extends for substantially the entire length of the cover 64, as viewed in FIGS. 1 and 3. Each end of the step tread 122 is fixed to an associated one of a pair of mounting brackets 124 (FIGS. 4 and 5). The brackets 124 are attached to the cover 64 in a suitable manner, such as by rivets or threaded fasteners. The step tread 122 is preferably made from extruded metal and is mounted adjacent to an inclined surface 126 (FIG. 4) of the cover 64. The inclined surface 126 extends between the cover side surfaces 128 and a cover top surface 130.

A lower step 142 is fixed to the support lips 43a, 43b by a pair of mirror image metal mounting brackets 144. The lower step 142 is located below the step tread 122 and laterally outward of the tanks. The lower step serves to reinforce the brackets against spreading under the weight of the batteries, the box and the tanks. Thus, the supports 40, the lower step 122 and the brackets 144 form a frame supporting the novel battery box, step and tank assembly 10.

From the above description of a preferred embodiment of the invention, those skilled in the art will perceive improvements, changes and modifications. Such improvements, changes and modifications within the skill of the art are intended to be covered by the appended claims.

Having described at least one preferred embodiment of the invention, what is claimed is:

1. An apparatus for supporting at least one battery and attaching at least one fluid pressure reservoir to a vehicle having longitudinally extending rails supporting a cab, said apparatus comprising:

support members for attachment to a rail of the vehicle;

a container having a tray member supportedly connected to said support members for supporting at least one battery, the container having a cover detachably secured to the troy member for enclosing such at least one battery;

a fluid pressure reservoir;

mounting structure attached to one of said members and fixing the fluid pressure reservoir in reinforcing relationship with the tray member; and, said mounting structure depending from a bottom surface of said container.

2. The apparatus in claim 1 further including a step tread fixed to a selected component of the apparatus to facilitate ingress to and egress from the cab.

3. The apparatus in claim 2 further including a step connected to the support members to form a support frame, the step being at a location below said step tread.

4. The apparatus in claim 1 wherein said cover is moveable relative to said tray to and from an enclosing position to permit said cover to be removed from said tray for accessing such at least one battery.

5. The apparatus in claim 4 further including a cover retention structure comprising a spring clamp and a fastener mechanism operably interposed between the container and the cover, wherein the spring clamp holds a first end portion of said cover in the enclosing position relative to a first end portion of said tray and the fastener mechanism when in an engaged position holding a second end portion of said cover against a second end portion of said tray, said spring clamp being adapted to permit said cover to move relative to said tray when said fastener mechanism is in a released position.

6. The apparatus in claim 1 wherein the tray includes recessed depending stiffeners engaging the exterior of the fluid pressure reservoir and conformable straps engaging other portions of the exterior of the reservoir to retain the reservoir in engagement with the recesses.

7. The apparatus in claim 6 wherein each recess is defined by an arcuate surface integrally formed in said tray.

8. A vehicle container, air tank and step assembly for enclosing at least one vehicle battery and for providing steps and at least one fluid pressure tank for a vehicle having longitudinally extending rail members, said assembly comprising:

a) a spaced pair of supports for attachment to such rail member;

b) a reinforced plastic molded tray supportably carried by the supports and having a surface for supporting at least one battery;

c) a cover detachably secured to said tray for enclosing such at least one battery;

d) a step tread attached to the cover;

e) the tray including spaced, depending stiffeners extending longitudinally of the tray;

f) each stiffener including at least one downwardly directed arcuate surface facing in a direction opposite said tray surface;

g) a cylindrical tank secured to the tray and engaging the recesses to strengthen said tray; and, h) a step attached to said supports and positioned below said step tread when in use.

9. The assembly of claim 8 further including retention structure comprising a spring clamp and a fastener mechanism, said spring clamp holding a first portion of said cover in an enclosing position relative to a first portion of said tray when said fastener mechanism holding a second portion of said cover to a second portion of said tray, said spring clamp permitting said cover to move relative to said tray for removal of said cover from said tray when said fastener mechanism is in a released condition.

10. The assembly of claim 8 wherein said step is spaced from the tank.

11. In a vehicle having an elongate rail forming a portion of a vehicle frame, an improved battery box assembly comprising:

a) a unitary molded container tray delineating multiple sides of a battery retention space, one of the sides being a surface for supporting at least one battery;

b) a container closure movably connectable to the container tray to delineate the remainder of the retention space and allow access to permit battery placement in and removal from the retention space;

c) structure fixedly connecting the container tray to the rail;

d) the container tray having a bottom surface including at least one of a pair of integrally molded reinforcing members, the members each including a downwardly open recess;

e) an air tank at least partially positioned in the recesses in a container tray reinforcing relationship; and f) connection structure fixing the air tank and container tray together with the tank secured in the recesses in container reenforcing relationship.

12. The assembly in claim 11 wherein the container tray has a plurality of pairs of recesses and further including a plurality of air tanks fixed to the container tray, each tank being positioned in a respective recess pair in a container tray reinforcing relationship.

13. The assembly of claim 11 further including a step tread fixed to the container closure and positioned to provide assistance in gaining access to a vehicle compartment.

14. A vehicle comprising a) a vehicle including a spaced pair of longitudinally extending rails;

b) a cab supported by the vehicle frame and including an operator space and an access door to the operator space;

c) a battery box, step and air tank assembly connected to the frame at a location below at least a majority of the cab and beneath the door; and, d) the assembly comprising:
   i) a battery box including a base having a battery support portion and a relatively moveable cover;
   ii) closure structure normally maintaining the cover secured to the base when the vehicle is in use to provide a battery containing enclosed space;
   iii) a spaced pair of supports secured to one of the rails and supportively engaging the box;

iv) the base including a spaced pair of longitudinally extending stiffeners providing longitudinal rigidity to the support portion;

v) the stiffeners including pairs of transversely aligned, downwardly open recesses;

vi) a plurality of air tanks each positioned in engagement with surfaces defining an associated one of the recess pairs;

vii) support structure operatively connected to the tanks and the base and maintaining the tanks in transverse base stiffening engagement with the associated recess surfaces;

viii) a step connected to the supports to facilitate operator space ingress and egress; and, ix) the step and supports together being a rigid box supporting frame.

15. The vehicle of claim 14 wherein the box is a fiber reinforced molded plastic.

16. The vehicle of claim 14 wherein the closure structure permits facile removal of the cover for access to batteries in the battery space.

17. The vehicle of claim 16 wherein the closure structure includes at least two spring clamps and at least two latch mechanisms.

18. A vehicle comprising
  a) a frame including a spaced pair of longitudinally extending rails;
  b) a cab supported by the vehicle frame and including an operator space and an access door to the operator space; and;
  c) a battery box and air tank assembly connected to the frame at a location below at least a majority of the cab and beneath the door;
  d) the assembly comprising:
    i) a battery box including a base having a battery support portion and a relatively moveable cover;
    ii) closure structure normally maintaining the cover secured to the base when the vehicle is in use to provide a battery containing enclosed space;
    iii) supports secured to one of the rails and supportively engaging the box, the box being supported under the door;
    iv) the base including a spaced pair of longitudinally extending stiffeners providing longitudinal rigidity to the support portion;
    v) the stiffeners including pairs of transversely aligned, downwardly open recesses;
    vi) a plurality of air tanks each positioned in engagement with surfaces defining an associated one of the recess pairs; and,
    vii) support structure operatively connected to the tanks and the base and maintaining the tanks in transverse base stiffening engagement with the associated recess surfaces.

19. The vehicle of claim 18 wherein the box is a fiber reinforced molded plastic.

20. The vehicle of claim 18 wherein the closure structure permits facile removal of the cover for access to batteries in the battery space.

21. The vehicle of claim 18 wherein the closure structure includes at least two Spring clamps and at least two fastener mechanisms.

22. For use in a vehicle, a battery box, and air tank assembly comprising:
  a) a battery box including a base having a battery support portion and a relatively moveable cover;
  b) closure structure normally maintaining the cover secured to the base when the assembly is in use to provide a battery containing enclosed space;
  c) a spaced pair of supports for securement to a vehicle for supportively engaging the box;
  d) the base including a spaced pair of longitudinally extending stiffeners providing longitudinal rigidity to the support portion;
  e) the stiffeners including pairs of transversely aligned, open recesses extending downwardly when the assembly is in use;
  f) a plurality of air tanks each positioned in engagement with surfaces defining an associated one of the recess pairs; and,
  g) support structure operatively connected to the tanks and the base and maintaining the tanks in transverse base stiffening engagement with the associated recess surfaces.

23. The assembly of claim 22 wherein the box is a fiber reinforced molded plastic.

24. The assembly of claim 22 wherein the closure structure permits facile removal of the cover for access to batteries in the battery space.

25. The assembly of claim 22 wherein the closure structure includes at least two spring clamps and at least two fastener mechanisms.

26. For use in a vehicle, a battery box, step and air tank assembly comprising:
  a) a battery box including a base having a battery support portion and a relatively moveable cover;
  b) closure structure normally maintaining the cover secured to the base when the assembly is in use to provide a battery containing enclosed space;
  c) a spaced pair of supports for securement to a vehicle and supportively engaging the box;
  d) the base including a spaced pair of longitudinally extending stiffeners providing longitudinal rigidity to the support portion;
  e) the stiffeners including pairs of transversely aligned, open recesses which extend downwardly when in use;
  f) a plurality of air tanks each positioned in engagement with surfaces defining an associated one of the recess pairs;
  g) support structure operatively connected to the tanks and the base and maintaining the tanks in transverse base stiffening engagement with the associated recess surfaces;
  h) a step connected to the supports to facilitate operator space ingress and egress when the assembly is in use; and,
  i) the step and supports together being a rigid box supporting frame.

27. The vehicle of claim 26 wherein the box is a fiber reinforced molded plastic.

* * * * *